UNITED STATES PATENT OFFICE 2,181,782

PRODUCTION OF MODIFIED DEXTRINS

Philip Dalton Coppock, Higher Bebington, England

No Drawing. Application January 12, 1938, Serial No. 184,707. In Great Britain January 28, 1937

6 Claims. (Cl. 127—34)

This invention relates to the production from dextrins of cold water gum powders and the like adhesives which are soluble in cold water without the formation of lumps. It is known to produce dry glues from aqueous solutions of dextrin by evaporation and final drying and it is known to mix dextrin with salts in a mechanical manner for the production of dry glues. Both of these methods involve technical disadvantages, as the first-mentioned method is tedious and costly and the second gives products which will not dissolve without forming lumps. It has also been proposed to mix dextrins with small quantities of polyhydric alcohols and to subject the reaction mixture for a short time to a temperature not exceeding 80° C.

It has now been found that cold water gum powders and glue powders soluble in cold water without forming lumps can be obtained from commercial dry-roasted dextrins by simple heat treatment in the dry state at moderate temperatures and pressures and if necessary regrinding. According to the present invention, dextrins are converted to cold water gum powders by subjecting dextrins in the dry state and under pressure for a very short period of time of the order of 3 to 15 minutes to a temperature short of that which would produce charring. The preferred range lies between 70° and 130° C. and depends somewhat on the kind of dextrin being treated. Moderate pressure is applied during the treatment, such as is obtained for example by carrying out the process in a heated press of the type used for Bakelite mouldings. If desired, small amounts of preservatives such as sodium bisulphite, beta-naphthol, or benzoic acid may be incorporated in the dextrin before treatment.

The technical properties of the gum powders obtained may be improved by adding to the dextrins salts such as borax, sodium phosphate or other salts known in the art. The products may, if desired, be rendered lighter in colour by the incorporation with the dextrins to be treated of bleaching agents such as sodium perborate. The dextrins are treated in the dry state, that is to say, in the presence of the combined or adsorbed water that they contain normally. During the treatment the original structure of the dextrins is modified by the sintering of the product and a mass of uniform consistency is obtained which after cooling may be ground to the desired degree of fineness by any known means.

A suitable degree of grinding of the dextrin when modified by the heat treatment is a degree such that the particles will pass through a 16 mesh screen i. e. one having 256 holes to the square inch but not so fine as to cause lumps to be formed when the ground dextrin is mixed with cold water.

The following examples illustrate the method of carrying out the invention.

Example 1

Yellow farina dextrin was heated in an electrically heated press for four minutes, the temperature of the core of the press cake being 87° C. The product after cooling and grinding was a cold water gum powder completely soluble in cold water without lumping.

Example 2

| | |
|---|---|
| Pale light shade yellow farina dextrin | 440 lbs. |
| $Na_2S_2O_5$ | 2 lbs. 4 oz. |
| $Na_3PO_4 12H_2O$ | 1 lb. 12 oz. |
| B. naphthol | 1 lb. 6 oz. | were mixed for one hour in an ordinary dry flour mixer.

The above mixture was then processed by heating in the hot press for 4 minutes.

The press cakes were removed from the press, allowed to cool and then ground and sieved.

The resultant product was a high solubility gum powder capable of giving solutions of workable viscosity even at a concentration of 1½ parts by weight of the gum powder to 1 part by weight of cold water.

Example 3

| | |
|---|---|
| Yellow farina dextrin | 440 lbs. |
| Borax | 33 lbs. 8 oz. |
| $Na_3PO_4 12H_2O$ | 4 lbs. 12 oz. |
| B. naphthol | 8 oz. | were mixed for one hour in an ordinary dry flour mixer.

The above mixture was then processed by heating in the hot press for 4 minutes.

The press cakes were removed from the press, allowed to cool and then ground and sieved.

The resultant product was a fairly high viscosity glue powder and gave a thick glue when one part by weight of the powder was mixed with 1½ parts by weight of cold water.

The pressure exerted in the press need not be great and may in fact be quite small, being of the order of ½ lb. to 1 lb. per square inch. The pressure may be exerted as a dead weight by a plate free to follow up and maintain continuous contact with the dextrin, as the latter contracts on heating, when the separate particles melt together to give a solid cake. Such a cake should then be ground and sieved.

What I claim is:

1. A process of rendering commercial dry-roasted dextrin non-lump-forming when mixed with water, comprising essentially subjecting said dextrin in the dry state to a temperature of from about 70° C. to about 130° C. for a period of the order of from about 3 to about 15 minutes between heated plates under a pressure of the order of 1 lb. per square inch, and regrinding the mass to particles of a size represented by ability to just pass through a 16 mesh screen.

2. A process of rendering commercial dry-roasted dextrin non-lump-forming when mixed with water, comprising essentially subjecting said dextrin in the dry state for a period of from about 3 to about 15 minutes to a temperature of the order of from about 70° C. to about 130° C. between heated plates under a pressure of the order of 1 lb. per square inch.

3. A process of rendering commercial dry-roasted dextrin non-lump-forming when mixed with water, comprising essentially subjecting said dextrin in the dry state for a period of from about 3 to about 15 minutes to a temperature of the order of from about 70° C. to about 130° C. between heated plates under a pressure of the order of 1 lb. per square inch and then grinding the mass to powder.

4. A process of rendering commercial dry-roasted dextrin non-lump-forming when mixed with cold water, comprising essentially mixing said dextrin in the dry state with a preservative agent, subjecting the mixture to a temperature of the order of from about 70° C. to about 130° C. for a period of from about 3 to about 15 minutes between heated plates under a pressure of the order of 1 lb. per square inch, and grinding the mass to powder.

5. A process of rendering commercial dry-roasted dextrin non-lump-forming when mixed with cold water, comprising essentially mixing said dextrin with a bleaching agent, subjecting the mixture in the dry state to a temperature of the order of from about 70° C. to about 130° C. for a period of from about 3 to about 15 minutes between heated plates under a pressure of the order of 1 lb. per square inch, and grinding the mass to powder.

6. A process of rendering commercial dry-roasted dextrin non-lump-forming when mixed with cold water, comprising essentially mixing said dextrin with a salt of known improving character, subjecting the mixture in the dry state to a temperature of the order of from about 70° to about 130° C. for a period of from about 3 to about 15 minutes between heated plates under a pressure of the order of 1 lb. per square inch and grinding the mass to powder.

PHILIP DALTON COPPOCK.